No. 819,770. PATENTED MAY 8, 1906.
B. G. LAMME.
SYSTEM OF ELECTRICAL DISTRIBUTION.
APPLICATION FILED JUNE 30, 1904.

WITNESSES:
C. L. Belcher
Birney Hines

INVENTOR
Benjamin G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL DISTRIBUTION.

No. 819,770.    Specification of Letters Patent.    Patented May 8, 1906.

Application filed June 30, 1904. Serial No. 214,823.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems of Electrical Distribution, of which the following is a specification.

My invention relates to systems of electrical distribution which embody generators or rotary converters that are provided with shunt or separately-excited field-magnet windings; and it has for its object to provide means whereby such machines may serve the purpose of compound-wound machines without providing them with series field-magnet windings.

It sometimes happens that an electrical machine is desired for temporary use in such relations as demand a compound field-magnet winding or its equivalent and for a subsequent use as a shunt or separately-excited machine or for alternate use in the two relations. Under such conditions it will not be found desirable or feasible to provide the machines with series windings, particularly in case the space available for field-magnet windings is substantially occupied by shunt or separately-excited coils.

Figure 1:
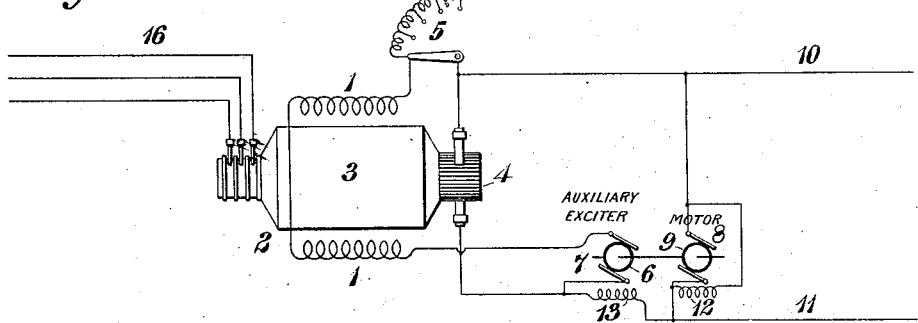
Figure 2:
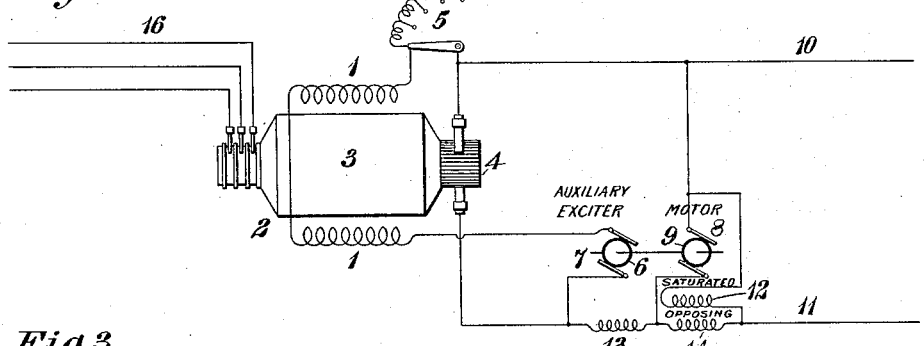
Figure 3:
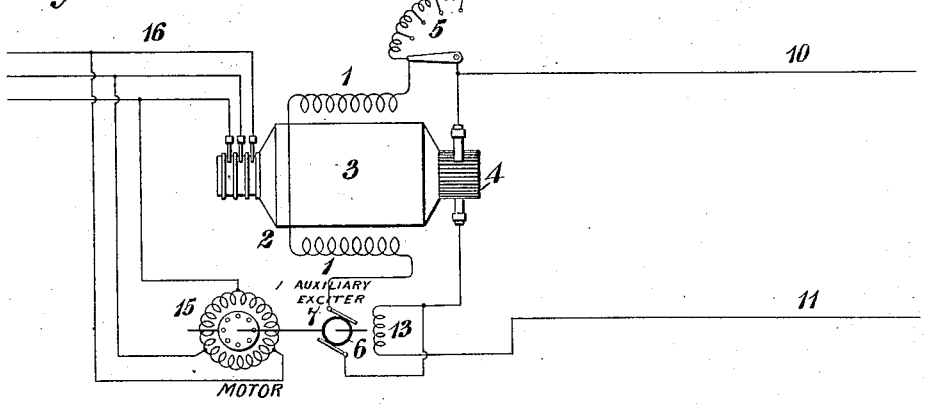

In order to meet the conditions of service above mentioned, I propose to employ a combination of a shunt or separately-excited rotary converter or generator with certain auxiliary machines, substantially as illustrated in the accompanying drawings, in which Figures 1, 2, and 3 are diagrammatic views of three different forms of such general combination.

As illustrated in Fig. 1, the field-magnet winding 1 of a rotary converter 2 is connected across the terminals of its armature 3 through its commutator 4, more or less of a variable resistance 5 being connected in series with such winding. The armature 6 of a small direct-current machine 7 is included in the field-magnet circuit and is driven by a motor 8, the armature 9 of which is connected across the main direct-current circuit 10 11 and the field-magnet winding 12 of which is connected in shunt to the armature. The small direct-current machine 7 may have its field-magnet winding 13 connected in series relation with the main circuit 10 11, so that it will generate no voltage when there is no current on the line. When the line is provided with a load, however, the field-magnet of the small direct-current machine will be excited and a voltage will be generated which will be proportional to the current in the line. This voltage will be added to that of the exciting-current of the main machine 2 in which a compounding effect is desired, and therefore the current in its field-magnet circuit will be increased as the load is increased. It follows, therefore, that substantially the same compounding effect will be produced that would be provided by a series field-magnet winding.

Various modifications of the combination above described may be made, and particularly if the motor which drives the small series generator is of the variable-speed type. As shown in Fig. 2, for example, the motor 8 is provided with a series field-magnet winding 14, which acts in opposition to the shunt-winding 12 and is connected in series relation with the main direct-current circuit 10 11, so that an increase of speed will be obtained as the load upon the main generator increases. If the driving-motor 8 of the compounding outfit is worked at high induction or above the bend in the saturation-curve for a condition of no load, it will increase in speed gradually as the main-circuit load is increased, and with heavier loads the speed will increase at a greater ratio as the magnetization passes below the bend in the saturation-curve. In this way the gradual speed increase of the small motor will give a greater voltage increase in the small generator, and thereby a greater degree of compounding for the main machine under heavier loads. It follows, therefore, that the ordinary droop or bend in the regulation curve of a compound-wound machine may be caused to disappear by reason of the fact that the compounding at heavier loads is greater in proportion than that at lighter loads.

In Fig. 3 I have shown a modification of my invention in which the small direct-current machine 7 is driven by an alternating-current motor 15 that receives its propelling energy from the alternating-current mains 16 that supply the rotary converter 2.

As already indicated, my invention is adapted for use in connection with either generators or rotary converters, and any structural features or circuit connections which it may be found desirable to employ I desire to be regarded as within the scope of my invention, so long as the mode of operation and result remain substantially the same.

I claim as my invention—

1. The combination with a dynamo-electric machine having a shunt field-magnet winding, of an auxiliary machine having its armature in the field-magnet circuit of the main machine and its field-magnet winding in series relation to the main distributing-circuit, and a motor for driving said auxiliary machine having its armature connected across the main distributing-circuit and having a shunt field-magnet winding and an opposing series winding, the magnetic circuit of the motor being saturated under no-load conditions.

2. The combination with a main dynamo-electric machine having a shunt field-magnet winding, of an auxiliary machine having its armature in series relation to the field-magnet winding of the main machine and its field-magnet winding in series relation to the main distributing-circuit and a shunt motor for driving said auxiliary machine that is connected across the main distributing-circuit and has a field-magnet winding that is connected in series relation to the main circuit and opposes the shunt winding.

In testimony whereof I have hereunto subscribed my name this 28th day of June, 1904.

BENJ. G. LAMME.

Witnesses:
E. M. STEWART,
BIRNEY HINES.